United States Patent
Perrone et al.

(10) Patent No.: US 8,677,326 B2
(45) Date of Patent: *Mar. 18, 2014

(54) DETECTING APPLICATIONS IN A VIRTUALIZATION ENVIRONMENT

(75) Inventors: Antonio Perrone, Rome (IT); Leonardo Rosati, Rome (IT); Paolo Salerno, Monterotondo (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/429,402

(22) Filed: Mar. 25, 2012

(65) Prior Publication Data
US 2012/0185845 A1 Jul. 19, 2012

Related U.S. Application Data

(63) Continuation of application No. 12/407,389, filed on Mar. 19, 2009.

(30) Foreign Application Priority Data

Mar. 20, 2008 (EP) .................................. 08153051

(51) Int. Cl.
*G06F 9/44* (2006.01)
*G06F 9/445* (2006.01)

(52) U.S. Cl.
USPC ........... 717/127; 717/128; 717/174; 717/176; 717/177

(58) Field of Classification Search
None
See application file for complete search history.

(56) References Cited

U.S. PATENT DOCUMENTS

| 7,313,512 B1 | 12/2007 | Traut et al. |
| 7,823,147 B2 * | 10/2010 | Moshir et al. ................ 717/173 |
| 7,979,898 B2 * | 7/2011 | Zarenin et al. .................... 726/7 |
| 8,161,473 B2 * | 4/2012 | Norrie ........................... 717/174 |
| 2002/0124245 A1 * | 9/2002 | Maddux et al. ............... 717/176 |
| 2003/0056200 A1 * | 3/2003 | Li et al. ......................... 717/128 |
| 2004/0194066 A1 | 9/2004 | Frey et al. |

(Continued)

FOREIGN PATENT DOCUMENTS

| CN | 1755628 A | 4/2006 |
| CN | 1937628 A | 3/2007 |

(Continued)

OTHER PUBLICATIONS

Geoffroy Vallée et al., "System Management Software for Virtual Environments", 2007 ACM, pp. 153-159, <http://dl.acm.org/citation.cfm?id=1242555>.*

(Continued)

Primary Examiner — Thuy Dao
Assistant Examiner — Cuong V Luu
(74) Attorney, Agent, or Firm — D'Ambrosio & Menon, PLLC; Usha Menon; Sudir Menon

(57) ABSTRACT

A method for allowing license tools to detect the installation of applications that are not physically installed on a machine when an Application Virtualization Environments is used. In one embodiment of the invention, the license tools may further detect application usage. In one embodiment of the invention, a virtual installation signature may be defined. Agents in a target computer may be used to compare the virtual installation signature of an application with a localized list of potential applications to detect whether the software is installed on the target computer.

9 Claims, 3 Drawing Sheets

(56) References Cited

U.S. PATENT DOCUMENTS

| | | | |
|---|---|---|---|
| 2004/0237067 A1 | 11/2004 | Sun et al. | |
| 2005/0044546 A1* | 2/2005 | Niebling et al. | 717/177 |
| 2005/0108707 A1* | 5/2005 | Taylor et al. | 717/177 |
| 2005/0193139 A1* | 9/2005 | Vinson et al. | 709/231 |
| 2005/0257214 A1* | 11/2005 | Moshir et al. | 717/171 |
| 2006/0026570 A1* | 2/2006 | Chan et al. | 717/127 |
| 2006/0059469 A1 | 3/2006 | Schumacher | |
| 2006/0107256 A1 | 5/2006 | Zarenin et al. | |
| 2007/0067433 A1* | 3/2007 | D'Alterio et al. | 709/223 |
| 2007/0240155 A1* | 10/2007 | Shlomai | 717/174 |
| 2009/0133001 A1* | 5/2009 | Rozenfeld | 717/127 |
| 2009/0199175 A1* | 8/2009 | Keller et al. | 717/178 |
| 2010/0138823 A1* | 6/2010 | Thornley | 717/174 |
| 2010/0218170 A1* | 8/2010 | MacLellan et al. | 717/127 |

FOREIGN PATENT DOCUMENTS

| | | |
|---|---|---|
| JP | H1083297 A | 3/1998 |
| JP | 2006018815 A | 1/2006 |
| JP | 2006227802 A | 8/2006 |
| JP | 2008016013 A | 1/2008 |
| WO | 9534857 A1 | 12/1995 |

OTHER PUBLICATIONS

Bowen Alpern et al., "PDS: A Virtual Execution Environment for Software Deployment", 2005 ACM, pp. 175-186, <http://dl.acm.org/citation.cfm?id=1065004>.*

Alan Dearle, "Software Deployment, Past, Present and Future", 2007 IEEE, 16 pages, <http://dl.acm.org/citation.cfm?id=1254724>.*

Stephen T. Jones et al., "Antfarm: Tracking Processes in a Virtual Machine Environment", 2006 USENIX, 24 pages, <http://static.usenix.org/event/usenix06/tech/full_papers/jones/jones_html/>.*

Richard S. Hall et al., "A Cooperative Approach to Support Software Deployment Using the Software Dock", 1999 IEEE, pp. 174-183, <http://ieeexplore.ieee.org/stamp/stamp.jsp?tp=&arnumber=841007>.*

Samuel T. King et al., "SubVirt: Implementing malware with virtual machines", 2006 IEEE, 14 pages, <http://ieeexplore.ieee.org/stamp/stamp.jsp?tp=&arnumber=1624022>.*

USPTO Final Office Action dated Oct. 11, 2012 for co-pending Parent U.S. Appl. No. 12/407,389.

English translation of SIPO Office Action dated Nov. 29, 2012 for co-pending Chinese patent app. No. 200980109285X.

International Search report and Written Opinon for related PCT application No. PCT/EP2009/051157 dated May 13, 2009.

Salamone, Salvatore; "Control Software Costs" BYTE St. Peterborough, NH (US) Apr. 1, 1995, vol. 20, No. 4 6 pages (pp. 75-78, 80, 82).

USPTO Office Action dated Jun. 28, 2012 for co-pending parent U.S. Appl. No. 12/407,389.

SIPO Office Action dated Nov. 29, 2012 for co-pending Chinese patent app. No. 200980109285X.

JPO Notice of Allowance dated May 9, 2013 for co-pending Japanese counterpart app. No. 2011-500134.

USPTO Notice of Allowance dated Aug. 28, 2013 for co-pending related U.S. Appl. No. 12/407,389.

USPTO Final Office Action dated Jun. 13, 2013 for co-pending related U.S. Appl. No. 12/407,389.

USPTO Non-Final Office Action dated Feb. 6, 2013 for co-pending related U.S. Appl. No. 12/407,389.

* cited by examiner

DETECTING APPLICATIONS IN A VIRTUALIZATION ENVIRONMENT

PRIORITY

This application is a continuation of U.S. Ser. No. 12/407,389 filed Mar. 19, 2009 which is based on and claims the benefit of priority from European Patent Application EP08153051.1 filed Mar. 20, 2008.

BACKGROUND

Applications deployed in a production environment must coexist in a common runtime environment, which is the operating system in which they have been installed. However, the installation of a new application typically damages an existing environment. As a result, already-tested applications can potentially conflict. Thus, greater IT resources are required to validate a production environment every time a new product is installed thereto or patched.

This may be addressed by using virtualization technology at the operating system level, e.g. VMWare. There are currently a number of products available like IBM Progressive Deployment System (PDS) (http://web.opensource.ibm.com/www/pds/) that use an application virtualization approach. Under this approach, while deployed applications share operating system and hardware settings with other applications, they also run in a virtual environment, working on their own private virtual files, directories and registries that define the application environment.

SUMMARY

Embodiments of the invention include methods for detecting a software application in a virtualization environment. In one embodiment of the invention, the method comprises storing the software application in a first repository; storing an identifier from an identifying component in a second repository, wherein the software application comprises the identifying component; providing a copy of the second repository to one or more recipient computers to form local identifier repositories; selecting one or more of the recipient computers; and extracting the identifier of the software application from the one or more local identifier repositories of the one or more selected recipient computers.

In another embodiment of the invention, a method for detecting the installation of the software application in a virtualization environment is disclosed. The method for detecting the installation of the software application in a virtualized environment comprises storing the software application in a first repository; storing an identifier from an identifying component in a second repository, wherein the software application comprises the identifying component; providing a copy of the second repository to one or more recipient computers to form local identifier repositories; selecting one or more of the recipient computers; extracting the identifier of the software application from the one or more local identifier repositories of the one or more selected recipient computers; interrogating the one or more selected recipient computers to ascertain whether the one or more selected recipient computers contains a matching copy of the identifier; and determining if the software application is installed on one or more selected recipient computers, in the event that a matching copy of the identifier is found on the one or more selected recipient computers.

The extraction of the identifier of the software application, interrogation of the one or more selected computers, and the determination that the software product is installed on one or more selected recipient computer further comprises execution of these steps by an agent in the selected recipient computer.

In one embodiment of the invention, the method comprises the preceding steps of dividing the application into a plurality of application components; providing an identifying component for the application; and storing the application components and the identifying component in the first repository.

In another embodiment of the invention, a method of detecting the usage of the software application in the virtualization environment is disclosed. The method of detecting the usage of the software application in the virtualization environment further comprises storing the software application in a first repository; storing an identifier from an identifying component in a second repository, wherein the software application comprises the identifying component; providing a copy of the second repository to one or more recipient computers to form local identifier repositories; selecting one or more of the recipient computers; extracting the identifier of the software application from the one or more local identifier repositories of the one or more selected recipient computers; interrogating a list of the processes currently running on the one or more selected recipient computers to ascertain whether the list comprises a matching copy of the identifier; and deciding that the one or more selected recipient computers is currently using the software application, in the event a matching copy is found.

The embodiments of the invention allow license tools to detect the installation of software that is not physically installed on a machine when an Application Virtualization Environments is used. Similarly, the embodiments of the invention allow license tools to detect the use of the software. In one embodiment of the invention, a new kind of signature, namely a virtual installation signature, may be defined. The virtual installation signature may be optionally used by a license tool to report installations performed in Application Virtualization Environments in a different way because the business meaning and cost of a virtualized installation is different from a regular one.

Implementations of the method discussed above may include a computer-implemented method. The details of one or more embodiments of the invention are set forth in the accompanying drawings and the description below. Other features of the invention will be apparent from the description and drawings, and from the claims.

DETAILED DESCRIPTION

At present, a usage signature is used to determine if an application is running on a target machine and an installation signature is used to determine if the product is simply installed on the target machine. However, products that create Application Virtualization Environments do not register an installed application in operating system registries (i.e. through registry keys); and do not execute any kind of explicit installation action (i.e. launching an installer) that would track the product installation. This behavior prevents a classic, not-instrumented license tool from identifying installed software. Similarly, the products that create Application Virtualization Environments do not necessarily run an application executable file name and size in the manner it would in a normal environment. This behavior prevents a classic, not-instrumented license tool from identifying the software that is running on a machine.

Embodiments of the invention use elements of an Application Virtualization Environment to detect the installation and use of software. For the sake of example, an embodiment of the invention is described with reference to the IBM Progressive Deployment System (PDS). However, it will be appreciated that the embodiments of the invention may apply to other Application Virtualization Environments.

Using the above-mentioned IBM Progressive Deployment System (PDS), an embodiment of the invention is based on the IBM Tivoli License Compliance Manager architecture. As before, the IBM Tivoli Licence Compliance Manager is used only for the purposes of example. In particular, it will be understood that the embodiments of the invention are in no way limited to the IBM Tivoli Licence Manager. Instead, it will be understood that embodiments of the invention may apply to any license manager tool. The IBM Tivoli License Manager is a license tool that provides software inventory, use metering, and license allocation services on distributed platforms. All these functions base their recognition of software applications or products installed or, in use, on the information defined in a software catalog.

Figure 1:
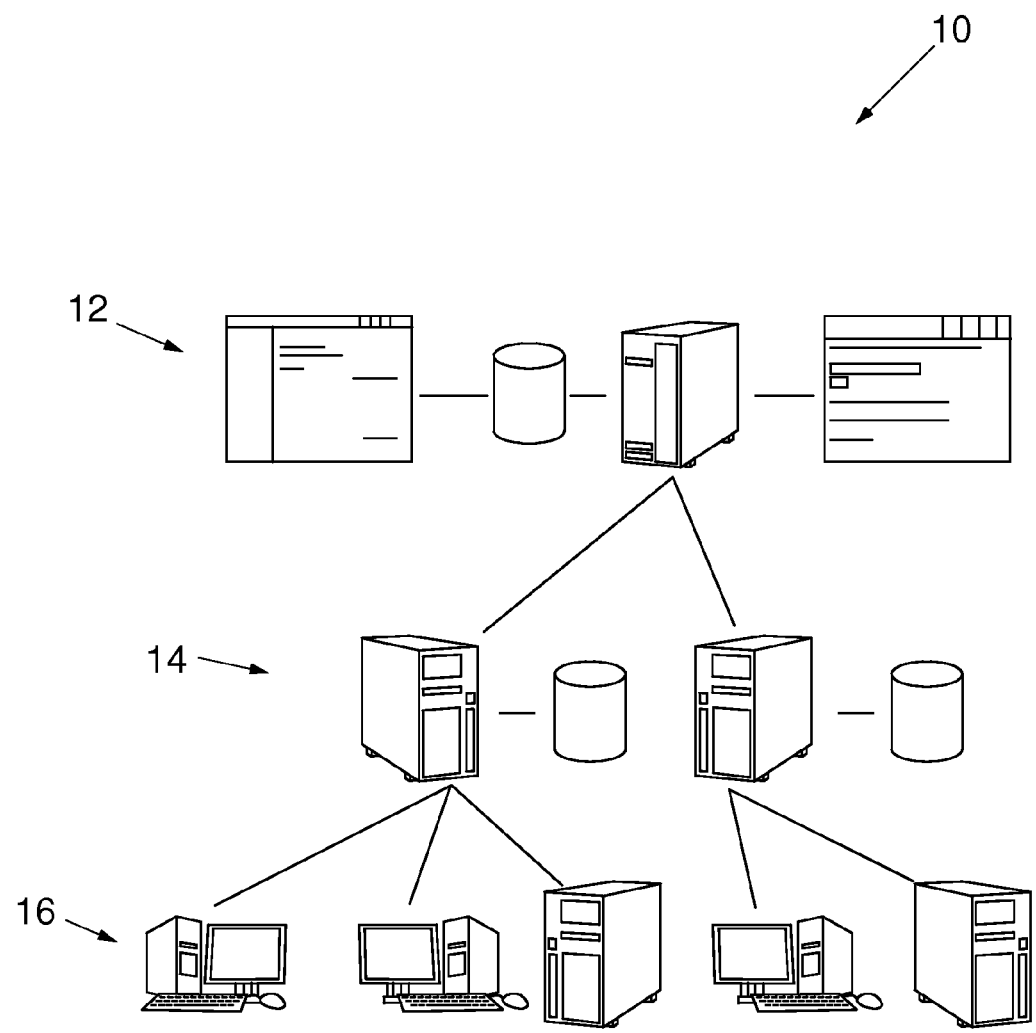
FIG. 1 is a block diagram of one embodiment of a network employing a license manager tool.

Referring to FIG. 1, in one embodiment of the invention, a network employing a license manager 10 may have a three-tiered architecture comprising an administration center 12, run-time servers 14 and target computers 16. The administration center 12 may contain one or more catalogs, listing installation details (i.e. registry keys) and usage signatures (i.e. executable files). In use, copies of the catalogs may be downloaded to target computers 16 (to form local copies of the catalog(s)). Each target computer 16 may comprise at least one agent which detects software installation and use by matching the software with the details in the local copy of the catalog.

Figure 2:
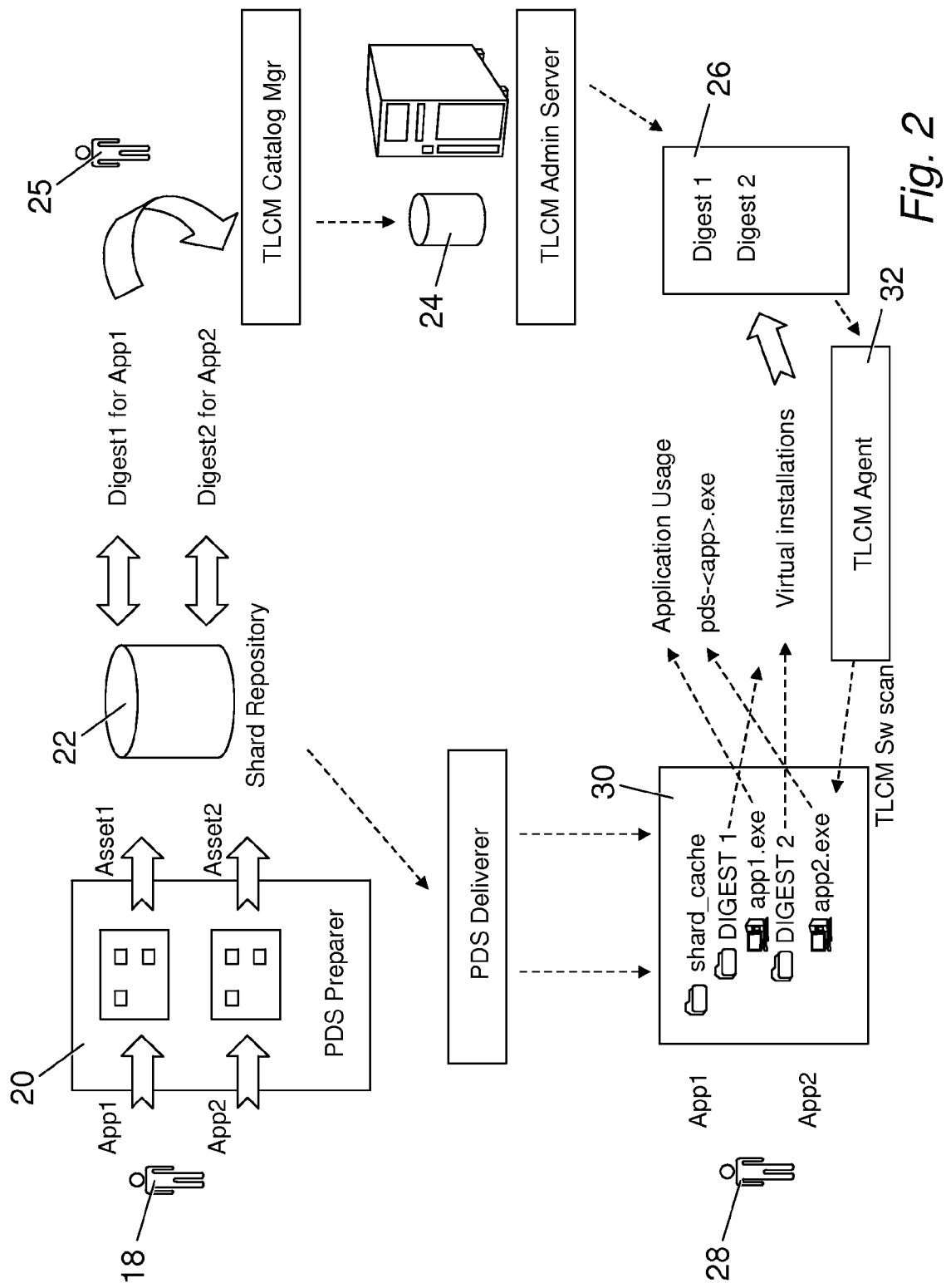
FIG. 2 is a schematic of one embodiment of the invention.

In Application Virtualization Environments, an application may be packaged into one or more packages ("Assets" in PDS). Each package contains a plurality of pieces ("Shards" in PDS) of the application, wherein an individual piece is known as a dice. Referring to FIG. 2, in one embodiment of the invention, individual dice may be retained in a shard repository 22. Thus, in use, a user may create packages from the application dices stored in the repository. Each package also contains a main dice, which may contain relevant information about the product it represents and about the other dice, (in PDS, when the shards are stored in a "shard repository", the main dice is called a "root metashard"). To ensure that the main dice uniquely identifies its application over all the other packaged applications, the main dice is a file whose name is an identifying signature.

Returning to FIG. 1, progressive download is a process in which the dices are downloaded one by one to a target computer 16, according to the requirements of the relevant application. However, the main dice is the first to be downloaded to the target computer 16. The main dice may be then stored locally on the recipient target computer 16 as a file whose name is that of the main dice itself. In most Application Virtualization Environments (like PDS), the executable file, once in execution, may be viewed as a process by other applications running as native applications (in PDS the name of the process is pds-<name-of-the-exe-file>).

In one embodiment of the invention, the identifying signature of a main dice, present on a target computer 16 when a software application is deployed and executed therein, may be used to detect the installation of the application. In this embodiment of the invention, the identifying signature may be added to the catalog in the administration center 12, as a new type of signature to identify "virtualized installations". This so-called virtual installation signature flags that an application is virtually installed on a target machine and running therein. Thus, when a virtualized application is executed on a target machine for the first time, (and the main dice is downloaded and saved therein as a file), an agent in the recipient target machine may be able to discover this file in the target machine's file system and match it with a corresponding entry in the local copy of the catalog to detect the virtualized installation.

Referring to one embodiment of the invention shown in FIG. 2, in use, a first user 18 (e.g. systems administrator) may use (for example) a PDS preparer 20 to convert two (for example) applications (App1, App2) to two packages (Asset1, Asset2). The packages and associated main dice (Digest1, Digest2) for each application (App1, App2) are stored in the repository 22. A server catalog (e.g. a TLCM catalog manager) is provided with two new entries, one for each dice, representing the products being monitored. At periodic intervals, copies of the catalog (and associated copies 26 of the main dice (Digest1, Digest2)) may be copied to potential target computers (not shown) for the applications.

In use, a second user's 28 browser (in a target machine) may be directed to the repository 22, and the second user 28 may be shown a list 30 of all the available applications. When the user selects a particular application, the relevant dices are downloaded (e.g. through a PDS deliverer) to the target machine. When a minimal necessary set of dices have been downloaded to the target machine, the application may be then be run thereon. In one embodiment of the invention, an agent 32 on the target machine may perform, for example, a TLCM software scan of the target machine. During this scan, the agent 32 may compare the locally stored copy of the main dice with the local copy of identifying signatures in the catalog downloaded from the server catalog 24.

Figure 3:
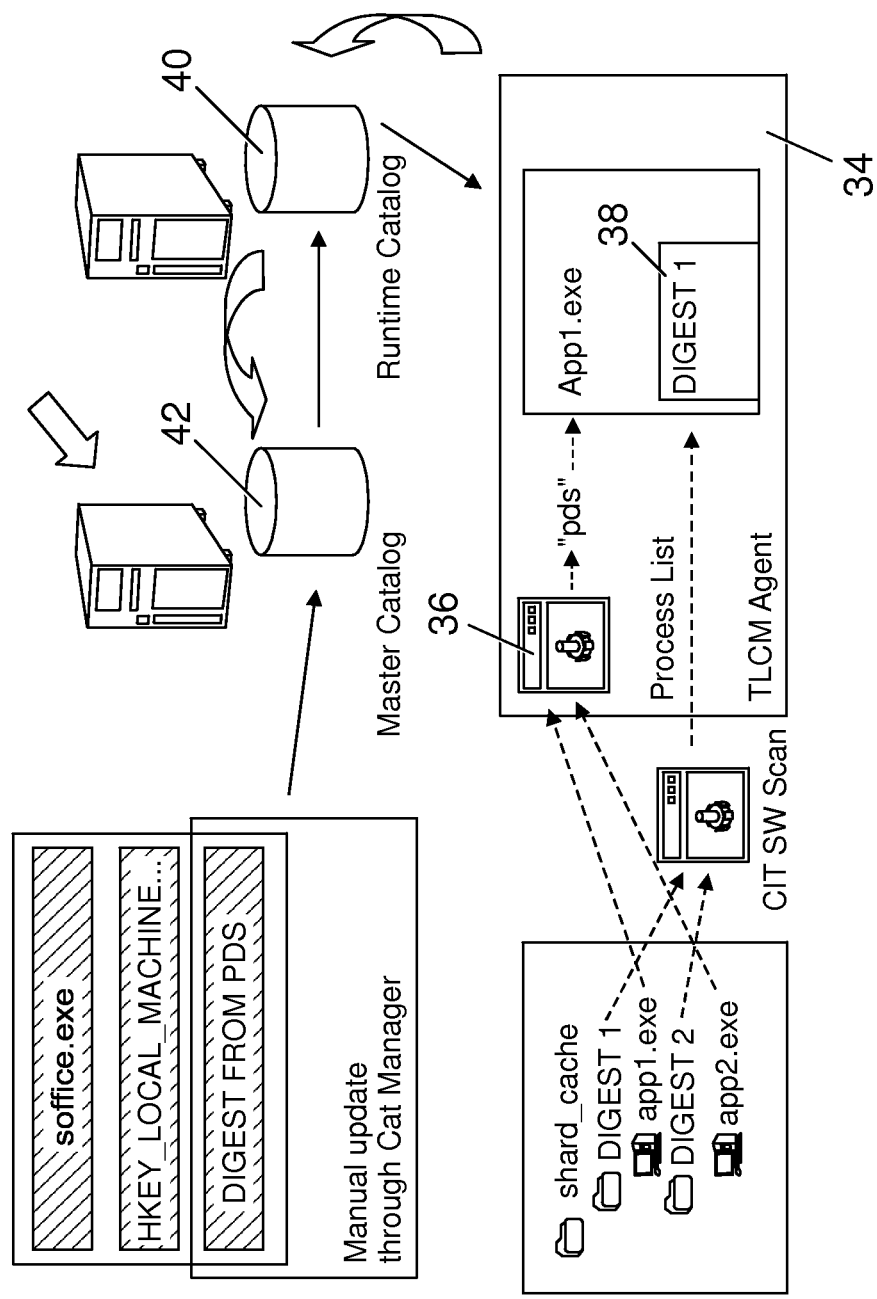
FIG. 3 is a schematic of another embodiment of the invention.

One embodiment of the invention may also provide two mechanisms for detecting the use of software in an Application Virtualization Environment. Referring to FIG. 3, in one embodiment a virtualized application through a native process may be detected, in which the preferred embodiment looks at the active processes running on the target computer 34 (i.e. an agent on a target computer 34 obtains a list of active processes) to look for an application whose name matches that of the main dice (in the local [runtime] copy 40 of the master catalog 42). In doing so, this approach may use a special logic to remove the effect of virtual environment modifications (i.e. cutting away "pds-" in PDS and retrieving the name of the original file).

In another embodiment, the application of interest is instrumented. In other words, the application is modified by the vendor to advise the licence manager when the application is starting. Thus, thus the licence manager does not need to check the process list to determine whether the application is running.

Exemplary methods for detecting the installation and usage of applications in a virtualized environment are described with reference to the accompanying drawings. The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

Embodiments of the invention may take the form of an entirely hardware embodiment, an entirely software embodiment or an embodiment containing both hardware and software elements. In one embodiment, the invention is implemented as a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It should also be understood that the inventive concepts disclosed herein are capable of many modifications. To the extent such modifications fall within the scope of the appended claims and their equivalents, they are intended to be covered by this patent.

The invention claimed is:

1. A method executable by a processor of detecting a software application in a virtualization environment, the method comprising:
   converting the software application into one or more packages, wherein each of the packages comprises:
      one or more dices, and
      a main dice, wherein the main dice comprises an identifier;
   storing the software application in a first repository;
   storing an identifier from an identifying component in a second repository, wherein the software application comprises the identifying component;
   providing a copy of the second repository to one or more recipient computers to form local identifier repositories;
   selecting one or more of the recipient computers, wherein a copy of the second repository is provided to the one or more selected recipient computers;
   downloading the main dice and a minimum set of the one or more dices to the one or more selected recipient computers, wherein the main dice is stored locally under a same name as the identifier; and
   detecting usage of the software application in the virtualization environment, comprising:
      interrogating a list of the processes currently running on the one or more selected recipient computers to ascertain whether the list comprises a matching copy of the identifier; and
      deciding that the one or more selected recipient computers is currently using the software application, in the event a matching copy is found.

2. The method of claim 1, further comprising detecting the installation of the software application in a virtualization environment.

3. The method of claim 2, wherein the detecting the installation further comprises:
   interrogating the one or more selected recipient computers to ascertain whether the one or more selected recipient computers contains a matching copy of the identifier; and
   concluding that the software application is installed on one or more selected recipient computers, in the event that a matching copy of the identifier is found on the one or more selected recipient computers.

4. The method of claim 1, wherein the extraction of the identifier of the software application further comprises execution by an agent in the selected recipient computer.

5. The method of claim 1, wherein the interrogation of the one or more selected computers further comprises execution by an agent in the selected recipient computer.

6. The method of claim 1, wherein the determination that the software product is installed on one or more selected recipient computers further comprises execution by an agent in the selected recipient computer.

7. The method of claim 1, further comprising forming the identifier from a name of the identifying component prior to storing the identifier.

8. The method of claim 1, further comprising initially providing an identifying component for the software application.

9. The method of claim 1, wherein the identifying component is stored in the first repository.

* * * * *